United States Patent Office 3,092,633
Patented June 4, 1963

3,092,633
2-ACYLATED 2,3-DIHYDRO-1H-PYRROLO-
[3,4-c]PYRIDINES
Shreekrishna M. Gadekar, Valley Cottage, and James R. Vaughan, Jr., New City, N.Y., and Selby B. Davis, Greenwich, Conn., assignors to American Cyanamid Company, New York, N.Y., a corporation of Maine
No Drawing. Filed Mar. 14, 1961, Ser. No. 95,509
4 Claims. (Cl. 260—295)

This invention relates to certain 2-acylated 2,3-dihydro-1H-pyrrolo[3,4-c]pyridines and, more particularly, is concerned with novel compounds which may be represented by the following general formula:

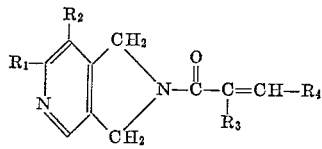

wherein $R_1$ is hydrogen or a methyl radical; $R_2$ is hydrogen or a halogen, hydroxy, lower alkoxy, amino or substituted amino radical; and $R_3$ and $R_4$ are each hydrogen or a lower alkyl radical. Suitable lower alkyl radicals are methyl, ethyl, propyl and isopropyl.

The organic bases of this invention form non-toxic, acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic and related acids. For purposes of this invention the free bases are equivalent to their non-toxic acid-addition salts.

The novel compounds of the present invention are, in general, white crystalline solids, somewhat soluble in polar solvents such as water, methanol, ethanol, acetone, dimethylformamide and the like; but relatively insoluble in non-polar solvents such as ether, benzene, petroleum ether, methylene chloride and the like.

The novel compounds of the present invention are valuable tranquillizing agents of low toxicity. They are selective depressants of the central nervous system and may be administered parenterally or orally. When so administered to mammals, they have been found to be useful in amounts ranging from about 1 to about 50 milligrams per kilogram of body weight.

The novel compounds of the present invention may be readily prepared by the interaction of an appropriate 2,3-dihydro-1H-pyrrolo[3,4-c]pyridine with a reactive derivative of an appropriate α,β-unsaturated alkanoic acid such as the acid halide, acid anhydride or ester. The intermediate 2,3-dihydro-1H-pyrrolo[3,4-c] pyridines corresponding to the following general formula:

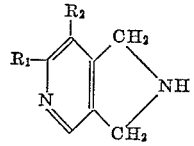

wherein $R_1$ is hydrogen or methyl, and $R_2$ is hydrogen, halogen, hydroxy, lower alkoxy, amino or substituted amino are known in the art and readily prepared by standard procedures. Similarly, the intermediate acid halides, acid anhydrides and esters of the appropriate α,β-unsaturated alkanoic acids are also known in the art and readily prepared by conventional methods.

The interaction of an appropriate 2,3-dihydro-1H-pyrrolo[3,4-c]pyridine with an appropriate α,β-unsaturated alkanoyl halide may be carried out at temperatures ranging from about 0° C. to about 100° C. For convenience, it is preferred to carry out the reaction in a solvent which will not enter into the reaction under the conditions employed. Solvents which may be used are, for example, benzene, toluene, tetrahydrofuran, chloroform, and the like. An acid acceptor such as an alkali metal hydroxide, pyridine, or triethylamine may also be employed.

The interaction of an appropriate 2,3-dihydro-1H-pyrrolo[3,4-c]pyridine with an appropriate α,β-unsaturated alkanoic anhydride may be carried out at temperatures ranging from about 50° C. to about 100° C. Solvents which may be used are, for example, chloroform, toluene, tetrahydrofuran, and the like.

The amidation of the lower alkyl esters of the appropriate α,β-unsaturated alkanoic acids with an appropriate 2,3-dihydro-1H-pyrrolo[3,4-c]pyridine may be brought about under conditions well known in the art.

The invention will be described in greater detail in conjunction with the following specific examples.

EXAMPLE 1

*6-Methyl-7-Chloro-2-Tigloyl-2,3-Dihydro-1H-Pyrrolo[3,4-c]Pyridine*

In 175 ml. of 1N sodium hydroxide was dissolved 9.5 g. (0.04 mole) of 6-methyl-7-chloro-2,3-dihydro-1H-pyrrolo[3,4-c]pyridine dihydrochloride and 4.7 g. (0.04 mole) of tigloyl chloride. The resulting solution was stirred at room temperature for two hours. The product, which had precipitated from the aqueous solution, was removed by filtration and recrystallized from aqueous ethanol. There was thus obtained 5.2 g. of 6-methyl-7-chloro - 2-tigloyl-2,3-dihydro-1H-pyrrolo-[3,4-c]pyridine, M.P. 133–135° C.

EXAMPLE 2

*6-Methyl-7-Chloro-2-(α-Ethylcrotonyl)-2,3-Dihydry-1H-Pyrrolo[3,4-c]Pyridine*

In 100 ml. of 1N sodium hydroxide was dissolved 4.9 g. (0.020 mole) of 6-methyl-7-chloro-2,3-dihydro-1H-pyrrolo[3,4-c]pyridine dihydrochloride and 3.0 g. (0.022 mole) of α-ethylcrotonyl chloride. The resulting solution was stirred at room temperature for two hours. The product, which had precipitated from the aqueous solution, was removed by filtration and recrystallized from aqueous ethanol. There was thus obtained 3.6 g. of 6-methyl - 7 - chloro - 2 - (α - ethylcrotonyl) - 2,3 - dihydro-1H-pyrrolo[3,4-c]pyridine, M.P. 120–121° C.

EXAMPLE 3

*6-Methyl-7-Amino-2-(α-Ethylcrotonyl)-2,3-Dihydro-1H-Pyrrolo[3,4-c]Pyridine*

In 100 ml. of 1N sodium hydroxide was dissolved 5.0 g. (0.0225 mole) of 6-methyl-7-amino-2,3-dihydro-1H-pyrrolo[3,4-c]pyridine dihydrochloride and 3.0 g. (0.0225 mole) of α-ethylcrotonyl chloride. The resulting solution was stirred at room temperature for two hours. The product, which had precipitated from the aqueous solution, was removed by filtration and recrystallized from aqueous ethanol. There was thus obtained 2.75 g. of 6-methyl-7-amino-2-(α-ethylcrotonyl)-2,3-dihydro-1H-pyrrolo[3,4-c]pyridine, M.P. 228–230° C. (dec.).

We claim:
1. A member of the class consisting of amides having the formula:

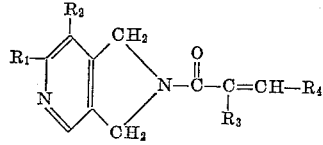

wherein $R_1$ is selected from the group consisting of hydrogen and methyl, $R_2$ is selected from the group consisting of hydrogen, halogen, hydroxy, lower alkoxy, and amino, and $R_3$ and $R_4$ are each selected from the group consisting of hydrogen and lower alkyl, and the non-toxic acid-addition salts thereof.

2. The compound 6-methyl-7-chloro-2-tigloyl-2,3-dihydro-1H-pyrrolo[3,4-c]pyridine.

3. The compound 6-methyl-7-chloro-2-($\alpha$-ethylcrotonyl)-2,3-dihydro-1H-pyrrolo[3,4-c]pyridine.

4. The compound 6-methyl-7-amino-2-($\alpha$-ethylcrotonyl)-2,3-dihydro-1H-pyrrolo[3,4-c]pyridine.

References Cited in the file of this patent
UNITED STATES PATENTS 2,767,191    Wright _____ Oct. 16, 1956

OTHER REFERENCES

Wright et al.: J.A.C.S., volume 79, pages 2199–2203 (1957).

Noller: "Chemistry of Organic Compounds," 2nd edition, pages 244—5 (1957) (Saunders).